(12) United States Patent
Jersa et al.

(10) Patent No.: US 8,519,834 B2
(45) Date of Patent: Aug. 27, 2013

(54) WRIST WOUND VIBRATING DEVICE

(76) Inventors: Andrea Theresa Jersa, Wildwood, MO (US); Michael Joseph Jersa, III, Wildwood, MO (US); Avinash Girish Bhardwaj, Wildwood, MO (US)

( * ) Notice: Subject to any disclaimer, the term of this patent is extended or adjusted under 35 U.S.C. 154(b) by 392 days.

(21) Appl. No.: 12/860,893

(22) Filed: Aug. 22, 2010

(65) Prior Publication Data

US 2012/0044062 A1    Feb. 23, 2012

(51) Int. Cl.
    *H04B 3/36*    (2006.01)
(52) U.S. Cl.
    USPC ............ 340/407.1; 340/407.2; 340/456; 340/693.5; 340/4.12; 340/8.1; 455/404.1; 455/404.2; 455/412.1; 455/418; 455/521
(58) Field of Classification Search
    USPC ........... 340/407.1, 407.2, 456, 693.5, 4.12, 340/801, 8.1; 455/404.1, 404.22, 412.1, 455/418, 521, 404.2
    See application file for complete search history.

(56) References Cited

U.S. PATENT DOCUMENTS

| D317,413 | S | 6/1991 | Veronesi | |
|---|---|---|---|---|
| 5,559,761 | A | 9/1996 | Frenkel | |
| 5,960,367 | A * | 9/1999 | Kita | 455/567 |
| 7,050,360 | B2 | 5/2006 | Saito | |
| D522,885 | S | 6/2006 | Le | |
| 7,336,929 | B2 | 2/2008 | Yasuda | |
| 7,657,281 | B2 | 2/2010 | Eibye | |
| 7,945,292 | B2 * | 5/2011 | Sweeney et al. | 455/567 |
| 2002/0115478 | A1 * | 8/2002 | Fujisawa et al. | 455/567 |
| 2003/0179656 | A1 | 9/2003 | Saito | |
| 2007/0026798 | A1 * | 2/2007 | Hoogstra | 455/41.2 |
| 2011/0300804 | A1 * | 12/2011 | Lu | 455/41.3 |

* cited by examiner

Primary Examiner — Tai T Nguyen

(57) ABSTRACT

A method for alerting a user of a received electronic signal includes coupling an electronic receiver within a wrist wound vibrating device, coupling a vibrating unit to the electronic receiver, and coupling a display panel to the electronic receiver. The method also includes receiving the electronic signal in the electronic receiver from a cell phone transmitter, actuating the vibrating unit in response to the received electronic signal to alert the user of the electronic signal, and displaying a message in the display panel of the wrist wound vibrating device to notify the user of the electronic signal.

14 Claims, 4 Drawing Sheets

WRIST WOUND VIBRATING DEVICE

FIELD OF THE INVENTION

This invention relates generally to a wrist wound vibrating device, and more particularly to methods and apparatus for receiving an electronic signal from a transmitting unit of a cell phone.

BACKGROUND OF THE INVENTION

Most consumers employ cell phones as a means for communicating with other consumers using similar devices. A traditional cell phone includes an alarm device integrated within the cell phone to alert a user of an incoming telephone call, an electronic text message, or other pertinent information that has been received. In order to observe the identity of a caller, view the electronic text message, or other pertinent information that has been received, the user is required to physically draw the cell phone from storage and observe its display panel. Consequently, the user may be unable to perform this activity while remaining discreet in certain circumstances such as while being present in places of worship, private meetings, social gatherings, Etc. Moreover, during circumstances in which the cell phone is out of earshot, the user may be oblivious to any communication received by the cell phone. Consequently, important telephone calls, electronic text messages, or other pertinent information received by the cell phone may be unattended to in time by the user. Therefore, there exists a need for a vibrating device with a display panel that when coupled to a user's wrist would discreetly enable the user to be cognizant of communication received by the cell phone, and subsequently transmit an electronic text message from the vibrating device to a recipient through the cell phone.

The need has existed for many years, yet there is no fully satisfactory system to meet the need. In accord with a long recognized need, there has been developed a wrist wound vibrating device to satisfy many users' communication needs. The device itself is compact and easily interchangeable with cell phones of various types. It is a versatile device in that the device can be used to receive and transmit electronic signals from/to a cell phone, a pager device, or any other electronic communication device known in the art as the need dictates. Importantly, the wrist wound vibrating device is efficient in operation.

BRIEF DESCRIPTION OF THE INVENTION

In one aspect, a method is provided for receiving an electronic signal in a wrist wound vibrating device and alerting a user of the electronic signal. The method comprises coupling an electronic receiver within the wrist wound vibrating device, coupling a vibrating unit to the electronic receiver, and coupling a display panel to the electronic receiver. The method also includes receiving the electronic signal in the electronic receiver from a cell phone transmitter, actuating the vibrating unit in response to the received electronic signal to alert the user of the received electronic signal, and displaying a message in the display panel of the wrist wound vibrating device to notify the user of the received electronic signal.

In another aspect of the invention, a vibrating device including a vibrating unit that may be actuated in response to an electronic signal is provided. The vibrating device includes an electronic receiver that is configured to receive the electronic signal from a cell phone transmitter. The electronic receiver is configured to be coupled to the vibrating unit and is configured to facilitate actuating the vibrating unit in response to the received electronic signal. Moreover, a display panel is configured to be coupled to the electronic receiver and is configured to display the received electronic signal.

In a further aspect, a wrist wound vibrating device for alerting a user of a received electronic signal is provided. The wrist wound vibrating device includes a vibrating device that is coupled to a strap and may be conveniently positioned on a user's wrist. The vibrating device includes an electronic receiver that is configured to receive the electronic signal from a cell phone transmitter. The electronic receiver is configured to be coupled to a vibrating unit and is configured to facilitate actuating the vibrating unit in response to the received electronic signal to alert the user of the received electronic signal. Moreover, a display panel is configured to be coupled to the electronic receiver and is configured to display the received electronic signal to the user.

DETAILED DESCRIPTION OF THE INVENTION

Figure 1:
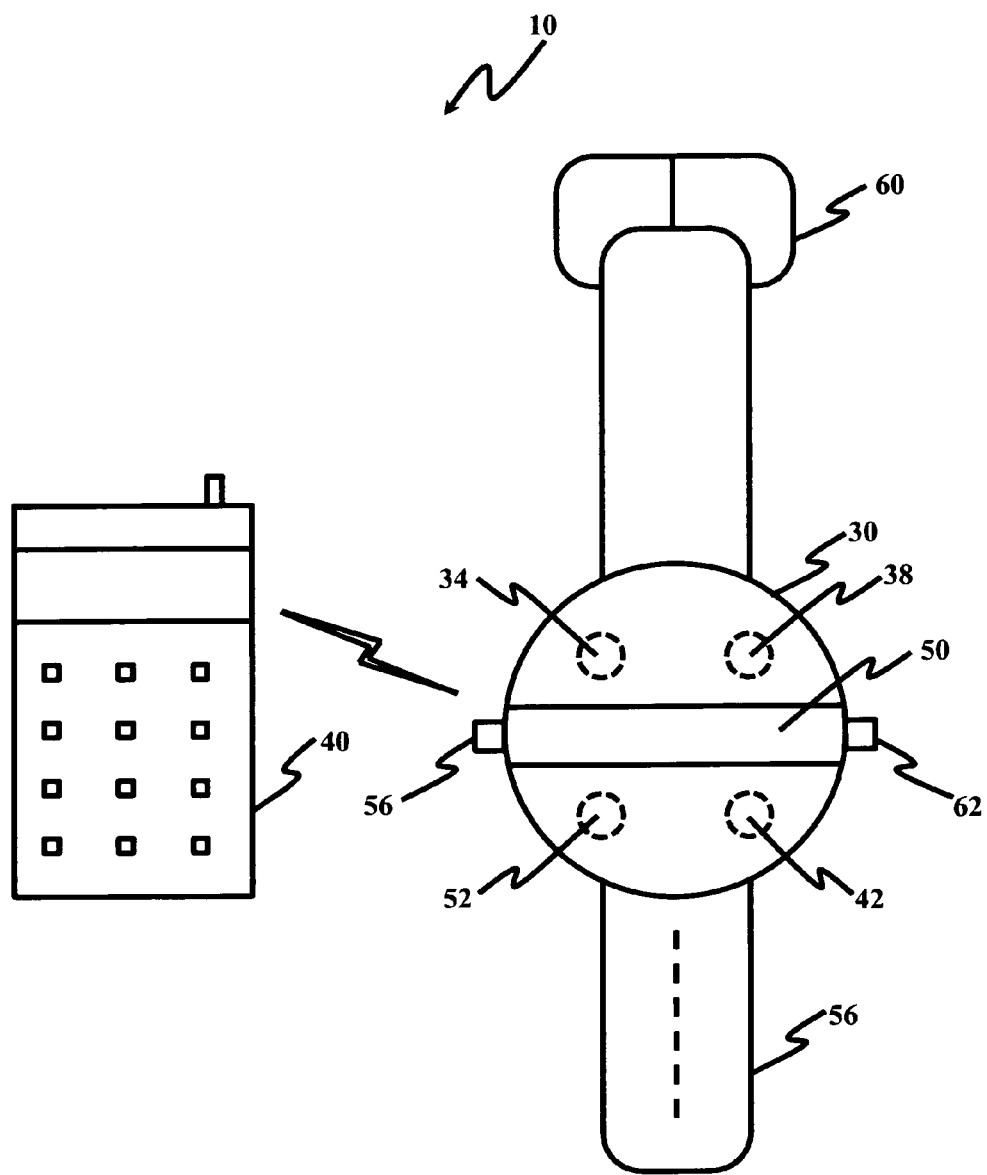
FIG. 1 is a schematic representation of a wrist wound vibrating device in electronic communication with a cell phone.

FIG. 1 is a schematic representation of a wrist wound vibrating device and cell phone assembly 10. More specifically, in the exemplary embodiment, a vibrating device 30 is in electronic communication with a cell phone 40.

The cell phone 40 includes an electronic receiver (not shown) that is configured to receive electronic communication including an electronic text message from a sender or a telephone call from a caller. On receiving electronic communication, cell phone 40 is configured to transmit an electronic signal to the vibrating device 30. More specifically, cell phone 40 is configured to transmit the electronic signal to the vibrating device 30 through an electronic transmitter (not shown) coupled to the cell phone 40. In the exemplary embodiment, the electronic signal includes an electronic text message with identifying information including a telephone number and/or an associated name of a sender, or identifying information including a telephone number and/or an associated name of a caller. In addition, the electronic signal may be any type of electromagnetic signal that facilitates operation of the wrist wound vibrating device and cell phone assembly 10 as described herein.

In an exemplary embodiment, vibrating device 30 includes a strap 56 coupled to the vibrating device 30. More specifically, strap 56 includes a buckle 60 or a hook-and-loop fastener for coupling the strap 56 to a wrist of a user. In an alternate exemplary embodiment, strap 56 may be coupled to any fastening mechanism known in the art for coupling the strap 56 and consequently the vibrating device 30 to the wrist of the user. In the exemplary embodiment, the strap 56 coupled to the vibrating device 30, and the fastening mechanism constitutes the wrist wound vibrating device.

In the exemplary embodiment, vibrating device 30 includes an electronic receiver 34 coupled to the vibrating device 30. Electronic receiver 34 is configured to be electronically coupled to the electronic transmitter that is coupled to the cell phone 40 and is configured to receive the electronic signal transmitted from the electronic transmitter. In an exemplary embodiment, electronic receiver 34 may be a wireless radio receiver, a wireless Bluetooth® receiver, or a wireless CDMA receiver depending on a signal range required by the user for receiving the electronic signal from the electronic transmitter coupled to the cell phone 40. Alternatively, electronic receiver 34 may be any type of wireless electronic receiver known in the art that may be configured to receive a corresponding electromagnetic signal from the electronic transmitter. In an exemplary embodiment, strap 56 includes receiver and transmitter antennae electronically coupled to the vibrating device 30 for long range reception and transmission of electronic signals between the cell phone 40 and the vibrating device 30.

In the exemplary embodiment, vibrating device 30 includes a vibrating unit 38 that is electronically coupled to the electronic receiver 34 and is configured to vibrate when the electronic signal is received from the cell phone 40. More specifically, electronic receiver 34 is configured to facilitate actuating the vibrating unit 38 when the electronic signal is received from the electronic transmitter coupled to the cell phone 40. The vibrations generated by the vibrating unit 38 are conductively transmitted to a bottom plate of the vibrating device 30 which are then transmitted to the wrist of the user. As a consequence of the vibrations sensed by the user, the user is cognizant of the electronic signal received in the electronic receiver 34 of the vibrating device 30 and consequently of the electronic communication received by the cell phone 40. In addition, in the exemplary embodiment, a display panel 50 is electronically coupled to the electronic receiver 34 and is configured to digitally display the electronic signal that includes the electronic text message with identifying information including a telephone number and/or an associated name of the sender, or identifying information including the telephone number and/or an associated name of the caller.

Vibrating device 30 includes a memory unit 52 coupled to the vibrating device 30. Memory unit 52 is electronically coupled to the electronic receiver 34 and is configured to acquire and store the electronic signal from the electronic receiver 34. More specifically, memory unit 52 is configured to acquire a finite list of entries that includes a finite number of electronic text messages with identifying information including the telephone numbers and/or the associated names of the senders, and a finite number of telephone numbers and/or the associated names of the callers. Memory unit 52 is further configured to automatically delete the oldest of the stored electronic text messages and telephone numbers in chronological order as the latest electronic text messages and telephone numbers are continuously acquired and stored by the memory unit 52 from the electronic receiver 34.

In the exemplary embodiment, vibrating device 30 includes a selector option switch 56. Selector option switch 56 may be operated by the user to electronically scroll and select an electronic text message from a plurality of preprogrammed electronic text messages stored within the memory unit 52 of the vibrating device 30. In addition, after the electronic text message has been selected, the user may confirm the selected electronic text message by operating a confirming option switch 62. Thereafter, the user may select a recipient telephone number/associated recipient name from the list of telephone numbers acquired and stored by the memory unit 52 from the electronic receiver 34, where the electronic text message is required to be delivered. More specifically, the user may select the recipient telephone number/associated recipient name from the list of entries acquired and stored by the memory unit 52 by operating the selector option switch 56, and confirm the selected recipient telephone number/acquired recipient name by operating the confirming option switch 62. Alternatively, the selector option switch 56 and confirming option switch 62 may be substituted with touch screen selector and confirming options respectively.

Vibrating device 30 includes an electronic transmitter 42 coupled to the memory unit 52 of the vibrating device 30. Electronic transmitter 42 is configured to be electronically coupled to an electronic receiver coupled to the cell phone 40 and is configured to transmit the selected electronic text message and recipient telephone number in the form of an electromagnetic signal to the electronic receiver. In an exemplary embodiment, electronic transmitter 42 may be a wireless radio transmitter, a wireless CDMA transmitter, or a wireless Bluetooth® transmitter depending on a signal range required by the user for transmitting the selected electronic text message to the cell phone 40. Alternatively, electronic transmitter 42 may be any type of wireless electronic transmitter known in the art that may be configured to transmit the selected electronic text message to the electronic receiver coupled to the cell phone 40. Cell phone 40 is further configured to automatically transmit the selected electronic text message to the recipient telephone number through an electronic transmitter coupled within the cell phone 40. In an exemplary embodiment, a single electronic receiver coupled to the cell phone 40 may be used to receive electronic signals from a variety of external electronic signal transmitting sources as well as the electronic transmitter 42. Moreover, in an exemplary embodiment, a single electronic transmitter coupled to the cell phone 40 may be used to transmit electronic signals to the electronic receiver 34 as well as the telephone number of the recipient.

Vibrating device 30 is further configured to receive an electronic signal on a real-time basis in the electronic receiver 34 from the electronic transmitter coupled to the cell phone 40. In the exemplary embodiment, the electronic signal received in the electronic receiver 34 on a real-time basis comprises a current date and time. The electronic signal comprising the current date and time may be digitally displayed on the display panel 50 of the vibrating device 30. Moreover, vibrating device 30 may be further configured to receive a variety of continuous/intermittent electronic signals in the electronic receiver 34 from the electronic transmitter coupled to the cell phone 40. The continuous/intermittent electronic signals received in the electronic receiver 34 comprises a variety of electronic signals such as but not limited to a current local weather signal, a current altitude signal, a current local temperature signal, a current local pressure signal, a current stock ticker signal, and a current news flash signal. In an exemplary embodiment, each of the continuous/intermittent electronic signals may be selectively displayed on the display panel 50 of the vibrating device 30 to be observed by the user. More specifically, in an exemplary embodiment, a variety of continuous/intermittent electronic signals may be received as communication from a variety of external, transmitting sources to the electronic receiver coupled to the cell phone 40. In an exemplary embodiment, electronic receiver 34 may be configured to receive any electronic signal from the cell phone 40 that is received as communication from the variety of external transmitting sources to the electronic receiver coupled to the cell phone 40. In a further exemplary embodiment, electronic receiver 34 may be programmable to receive a desired selection of electronic signals from the cell phone 40. More specifically, electronic receiver 34 may be programmable to receive a desired selection of electronic signals using software applications from a number of communication devices including a cell phone, a personal computer, or any other electronic devices known in the art.

Figure 2:
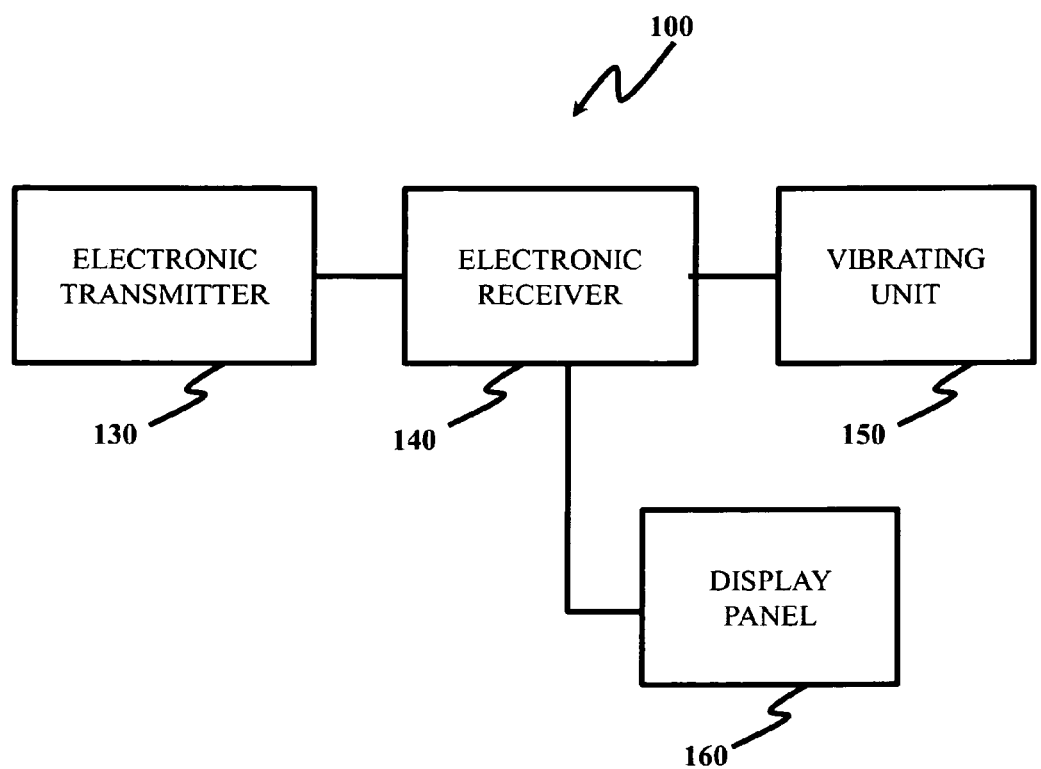
FIG. 2 is a block diagram of a communication system that exists between the cell phone and the wrist wound vibrating device shown in FIG. 1.

FIG. 2 is a block diagram 100 of a communication system between the cell phone 40 and vibrating device 30. In the exemplary embodiment, electronic transmitter 130 is coupled to the cell phone 40 and is configured to transmit an electronic signal when communication is received by the cell phone 40. Electronic transmitter 130 is in electronic communication with the electronic receiver 140 that is coupled to the vibrating device 30. More specifically, electronic receiver 140 is configured to receive the electronic signal from the electronic transmitter 130 when communication in the form of a telephone call or electronic text message is received by the cell phone 40. Electronic receiver 140 is configured to be coupled to the vibrating unit 150. More specifically, electronic receiver 140 is configured to facilitate actuating the vibrating unit 150 when the electronic signal is received in the electronic receiver 140 to alert the user of the received electronic signal. Electronic receiver 140 is further configured to be coupled to the display panel 160. More specifically, electronic receiver 140 is configured to facilitate displaying the electronic signal on the display panel 160 to notify the user of the telephone number of the caller or the electronic text message from a sender that has been received by the cell phone 40.

Figure 3:
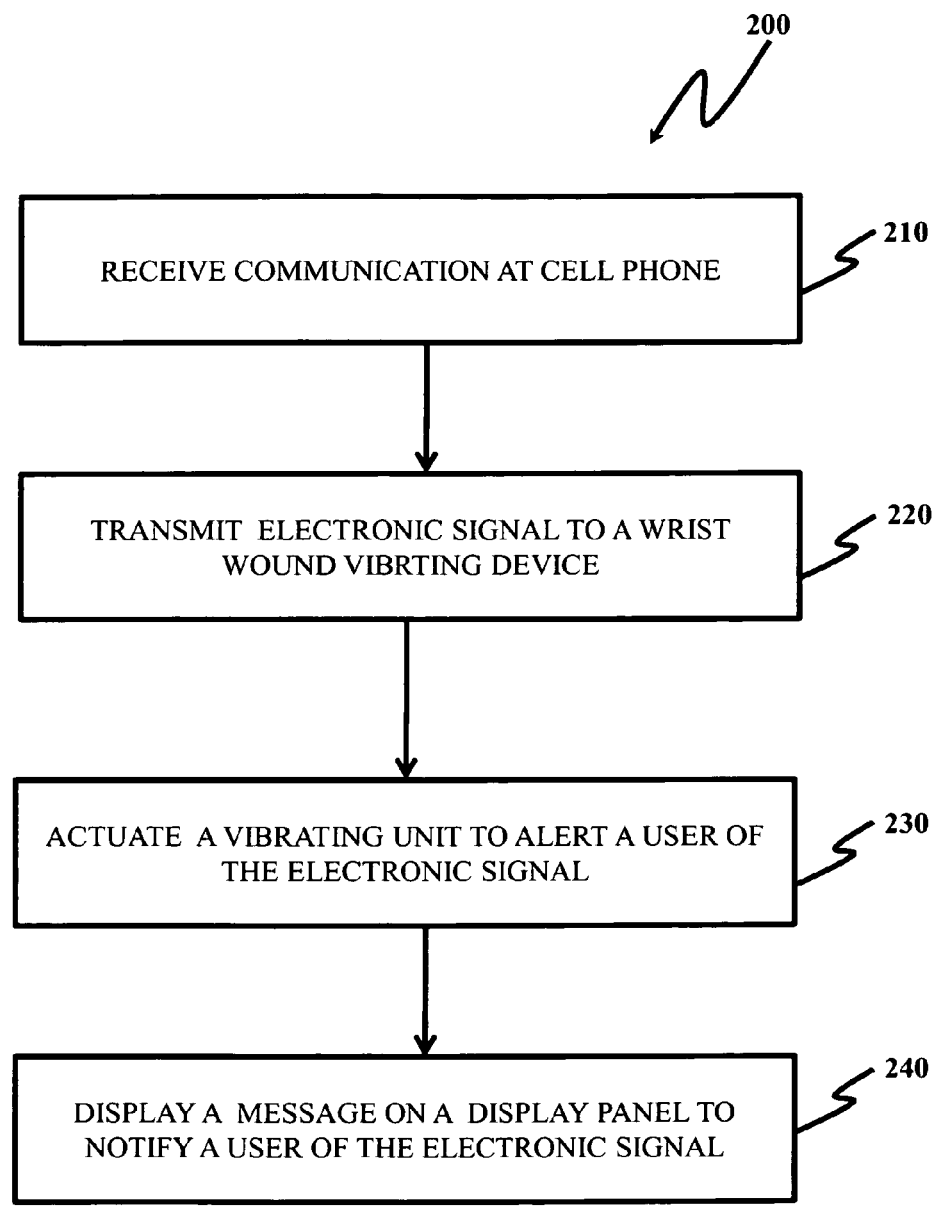
FIG. 3 is a flow diagram showing an exemplary control method between the cell phone and the wrist wound vibrating device shown in FIG. 1.

FIG. 3 is a flow diagram showing an exemplary control method 200 of operating the wrist wound vibrating device and cell phone assembly 10 in accordance with an embodiment of the present invention. In the exemplary embodiment, method 200 includes receiving 210 communication at the cell phone 40. More specifically, cell phone 40 includes an electronic receiver coupled within the cell phone 40 and is configured to receive a telephone call from a caller or an electronic text message from a sender.

Method 200 includes transmitting 220 an electronic signal to the wrist wound vibrating device. In the exemplary embodiment, the electronic transmitter coupled to the cell phone 40 is electronically coupled to the electronic receiver 34 and is configured to transmit the electronic signal to the electronic receiver 34. More specifically, the electronic transmitter coupled to the cell phone 40 is configured to transmit the electronic signal comprising the electronic text message with identifying information including the telephone number and/or an associated name of a sender, or identifying information including the telephone number and/or an associated name of the caller to the electronic receiver 34.

In the exemplary embodiment, method 200 includes actuating 230 the vibrating unit 38 to alert the user of the received electronic signal. More specifically, the electronic receiver 34 is coupled to the vibrating unit 38 and is configured to facilitate actuating the vibrating unit 38 when the electronic signal is received by the electronic receiver 34. The vibrations generated by the vibrating unit 38 are conductively transmitted to the bottom plate of the vibrating device 30 that is in physical contact with the wrist of the user. Consequently, the user is cognizant of the electronic signal received by the electronic receiver 34.

Method 200 includes displaying 240 an electronic message on the display panel 50 of the vibrating device 30 to notify the user of the received electronic signal. More specifically, display panel 50 is coupled to the electronic receiver 34 and is configured to display the electronic signal comprising the electronic text message with identifying information including the telephone number and/or an associated name of the sender, or identifying information including the telephone number and/or an associated name of the caller.

Figure 4:
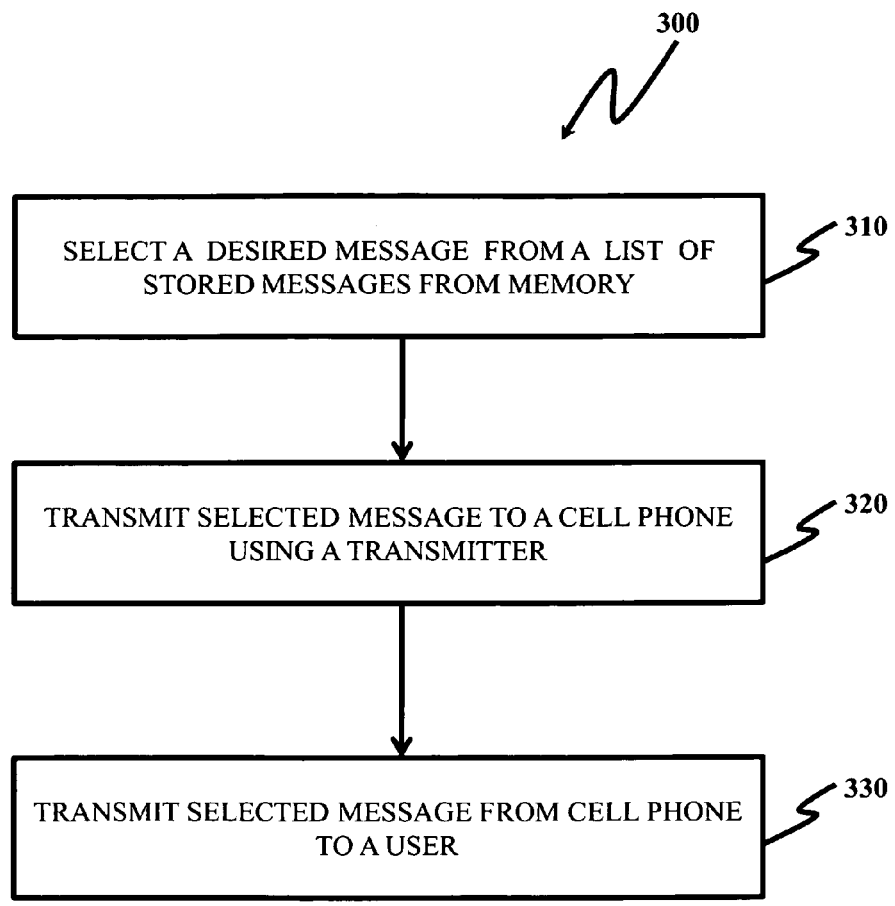
FIG. 4 is a flow diagram showing an exemplary control method between the wrist wound vibrating device and the cell phone shown in FIG. 1.

FIG. 4 is a flow diagram showing an exemplary control method 300 of operating the wrist wound vibrating device and cell phone assembly 10 in accordance with an embodiment of the present invention. In the exemplary embodiment, method 300 includes selecting 310 an electronic text message from a list of stored electronic text messages from the memory unit 52 of the vibrating device 30 by operating the selector option switch 56. The selected electronic text message may be subsequently confirmed by operating the confirming option switch 62. In addition, method 300 includes selecting the telephone number of the recipient/associated recipient name from the finite list of telephone numbers/associated recipient names acquired by the memory unit 52 by operating the selector option switch 56 and subsequently confirmed by operating the confirming option switch 62.

Method 300 includes transmitting 320 the selected electronic text message and telephone number of the recipient to the electronic receiver coupled to the cell phone 40. More specifically, the electronic transmitter 42 coupled to the memory unit 52 is configured to transmit the selected electronic text message to the electronic receiver coupled to the cell phone 40.

In the exemplary embodiment, method 300 includes transmitting 330 the selected electronic text message from the cell phone 40 to the telephone number of the recipient. More specifically, an electronic transmitter coupled to the cell phone 40 is configured to automatically transmit the selected electronic text message received from the electronic transmitter 42 to the telephone number of the recipient.

The above described wrist wound vibrating device and cell phone assembly 10 is cost effective and highly reliable. The wrist wound vibrating device and cell phone assembly 10 facilitates remotely receiving an electronic signal by a vibrating device 30 from a cell phone 40. Moreover, the vibration induced by the vibrating device 30 on the wrist of the user enables the user to be cognizant of communication received by the cell phone 40 while remaining discreet at the same time. The vibrating device 30 may be worn as a pendent on the user's neck, coupled to the user's bracelet, coupled to a ring that may be worn on the user's finger, or any other suitable fastening mechanism known in the art to facilitate contact between the vibrating device 30 and the user's skin thereby enabling a user to be cognizant of communication received by the cell phone 40. In addition, the vibrating device 30 includes rechargeable batteries that may be recharged using an electrical charging device when the power required to operate the vibrating device 30 decreases below a minimum threshold operating level. Moreover, the modular nature of each subsystem of the vibrating device 30 facilitates easy disassembly and replacement of individual system components as required.

The wrist wound vibrating device and cell phone assembly 10 may be used to conserve battery power in the cell phone 40. As a consequence of the user being alerted by the vibrating device 30 of the communication received by the cell phone 40, the alarm device in the cell phone 40 may be deactivated, thereby enabling the user to conserve on cell phone battery power. In addition, transmitting a continuous electronic signal comprising the date and time to the vibrating device 30 enables the user to travel between various national/international time zones, and still be equipped to receive the current date and time at a specific geographical location. Moreover, transmitting a variety of continuous/intermittent electronic signals at user desired ranges that include the current local weather signal, the current altitude signal, the current local temperature signal, the current local pressure signal, the current stock ticker signal, the current news flash signal, Etc. from the cell phone 40 to the vibrating device 30 eliminates the requirement of integrated transducer devices for measuring, determining, and notifying a few of the parameters mentioned above to a user. Therefore the cost incurred to the user may be substantially reduced, while simultaneously enhancing the utility value of the vibrating device 30.

Exemplary embodiments of a wrist wound vibrating device are described above in detail. The systems are not limited to the specific embodiments described herein, but rather components of each system may be utilized separately and independently from other components described herein.

While the invention has been described in terms of various specific embodiments, those skilled in the art will recognize that the invention can be practiced with modifications within the spirit and scope of the claims.

What is claimed is:

1. A method for receiving a first electronic signal and transmitting a second electronic signal in a vibrating device and alerting a user of the first electronic signal, said method comprising:
    coupling an electronic receiver within the vibrating device;
    coupling a vibrating unit to the electronic receiver;
    coupling a memory unit to the electronic receiver;
    coupling an electronic transmitter to the memory unit;
    coupling a selector option switch to the vibrating device;
    receiving the first electronic signal in the electronic receiver from a cell phone transmitter;
    storing the first electronic signal received in the electronic receiver in the memory unit;
    actuating the vibrating unit in response to the first electronic signal to alert the user of the first electronic signal;
    selecting an electronic text message from a plurality of pre-programmed electronic text messages stored in the memory unit using the selector option switch;
    selecting a recipient telephone number from a list of telephone numbers stored in the memory unit using the selector option switch; and
    transmitting the second electronic signal comprising the electronic text message and the recipient telephone number from the electronic transmitter of the vibrating device to a cell phone receiver.

2. A method in accordance with claim 1 further comprising:
    coupling a strap to the vibrating device; and
    coupling a strap fastening mechanism to the strap to facilitate coupling the strap to a wrist of the user.

3. A method in accordance with claim 1 further comprising:
    coupling a display panel to the electronic receiver; and
    displaying a digital message of the first electronic signal in the display panel to notify the user of the first electronic signal.

4. A method in accordance with claim 3 further comprising:
    receiving a third electronic signal comprising a date and time in real-time in the electronic receiver from the cell phone transmitter;
    receiving a fourth electronic signal comprising at least one of a calendar appointment notification signal, an e-mail notification signal, a current local weather signal, a current altitude signal, a current local temperature signal, a current local pressure signal, a current stock ticker signal, a current sport score signal, and a current news flash signal in the electronic receiver from the cell phone transmitter; and
    displaying a digital message of at least one of the second electronic signal and the third electronic signal in the display panel to notify the user of the at least one second electronic signal and the third electronic signal.

5. A method in accordance with claim 1 wherein receiving the first electronic signal includes receiving the first electronic signal comprising one of an electronic text message with identifying information of a sender and identifying information of a caller.

6. A vibrating device including a vibrating unit that may be actuated in response to a first electronic signal, said vibrating device comprising:
    an electronic receiver configured to be coupled to said vibrating device, said electronic receiver further configured to receive said first electronic signal, and at least one of a second electronic signal and a third electronic signal; and
    a vibrating unit configured to be coupled to said electronic receiver, said electronic receiver configured to facilitate actuating said vibrating unit in response to said first electronic signal;
    a memory unit configured to be coupled to said electronic receiver, said memory unit further configured to store said first electronic signal;
    a selector option switch configured to be coupled to said vibrating device, said selector option switch configured to select an electronic text message from a plurality of pre-programmed electronic text messages stored in said memory unit, said selector option switch further configured to select a recipient telephone number from a list of telephone numbers stored in said memory unit; and
    an electronic transmitter configured to be coupled to said memory unit of said vibrating device, said electronic transmitter further configured to transmit said electronic text message and said recipient telephone number to a cell phone receiver.

7. A vibrating device in accordance with claim 6 further comprising a display panel configured to be coupled to said electronic receiver, said display panel further configured to display said first electronic signal.

8. A vibrating device in accordance with claim 6 wherein said first electronic signal, and at least one of said second electronic signal and said third electronic signal is received from a cell phone transmitter.

9. A vibrating device in accordance with claim 6 wherein said first electronic signal comprises one of an electronic text message with identifying information of a sender and identifying information of a caller, said second electronic signal comprises a date and time in real-time, and said third electronic signal comprises at least one of a calendar appointment notification signal, an e-mail notification signal, a current local weather signal, a current altitude signal, a current local temperature signal, a current local pressure signal, a current stock ticker signal, a current sport score signal, and a current news flash signal.

10. A wrist wound vibrating device for alerting a user of a first electronic signal, said wrist wound vibrating device comprising:
    a strap;
    a vibrating device coupled to said strap, said vibrating device comprising:
        an electronic receiver configured to be coupled to said vibrating device, said electronic receiver further configured to receive said first electronic signal, and at least one of a second electronic signal and a third electronic signal;

a vibrating unit configured to be coupled to said electronic receiver, said electronic receiver configured to facilitate actuating said vibrating unit in response to said first electronic signal for alerting the user of said first electronic signal;

a memory unit configured to be coupled to said electronic receiver, said memory unit further configured to store said first electronic signal;

a selector option switch configured to be coupled to said vibrating device, said selector option switch configured to select an electronic text message from a plurality of pre-programmed electronic text messages stored in said memory unit, said selector option switch further configured to select a recipient telephone number from a list of telephone numbers stored in said memory unit; and an electronic transmitter configured to be coupled to said memory unit of said vibrating device, said electronic transmitter further configured to transmit said electronic text message and said recipient telephone number to a cell phone receiver.

11. A wrist wound vibrating device in accordance with claim 10 further comprising a display panel configured to be coupled to said electronic receiver, said display panel further configured to display said first electronic signal.

12. A wrist wound vibrating device in accordance with claim 10 wherein said first electronic signal, and at least one of said second electronic signal and said third electronic signal is received from a cell phone transmitter.

13. A wrist wound vibrating device in accordance with claim 10 wherein said first electronic signal comprises one of an electronic text message with identifying information of a sender and identifying information of a caller, said second electronic signal comprises a date and time in real-time, and said third electronic signal comprises at least one of a calendar appointment notification signal, an e-mail notification signal, a current local weather signal, a current altitude signal, a current local temperature signal, a current local pressure signal, a current stock ticker signal, a current sport score signal, and a current news flash signal.

14. A wrist wound vibrating device in accordance with claim 10 wherein said strap is coupled to a wrist of the user using a strap fastening mechanism, said strap fastening mechanism including one of a buckle and a hook-and-loop fastener.

* * * * *